United States Patent
Howard (10) Patent No.: US 10,165,448 B2
(45) Date of Patent: Dec. 25, 2018

(54) AUTHENTICATION BETWEEN WIRELESS CLIENT AND ACCESS POINT UTILIZING SMART CLIENT DETECTION

(71) Applicant: ARRIS Enterprises LLC, Suwanee, GA (US)

(72) Inventor: Bradley Thomas Howard, Suwanee, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 130 days.

(21) Appl. No.: 15/074,119

(22) Filed: Mar. 18, 2016

(65) Prior Publication Data
US 2017/0272951 A1    Sep. 21, 2017

(51) Int. Cl.
G06F 7/04        (2006.01)
H04W 12/08    (2009.01)
H04L 29/06    (2006.01)
G06F 21/57    (2013.01)

(52) U.S. Cl.
CPC .......... *H04W 12/08* (2013.01); *G06F 21/575* (2013.01); *H04L 63/08* (2013.01)

(58) Field of Classification Search
CPC ... H04L 12/4011; H04W 92/10; H04W 84/12; H04W 76/068; H04W 76/023; H04W 12/08
USPC .......................................................... 726/3
See application file for complete search history.

(56) References Cited

U.S. PATENT DOCUMENTS

| | | | | |
|---|---|---|---|---|
| 2013/0308493 A1* | 11/2013 | Viswanathan | ........ | H04W 24/02 370/254 |
| 2014/0355523 A1* | 12/2014 | Congdon | .............. | H04W 76/02 370/328 |
| 2014/0362841 A1* | 12/2014 | Shibata | ................. | H04W 48/18 370/338 |
| 2015/0230280 A1* | 8/2015 | Dees | ................... | H04W 76/023 455/39 |
| 2015/0319318 A1* | 11/2015 | Hashimoto | ........ | H04N 1/00244 358/473 |

(Continued)

OTHER PUBLICATIONS

Gupta et al, A Characterization of Wireless NIC Active Scanning Algorithms, 2007, IEEE, pp. 2387-2392.*

(Continued)

*Primary Examiner* — Luu T Pham
*Assistant Examiner* — Jenise E Jackson
(74) *Attorney, Agent, or Firm* — Bart A. Perkins (57) ABSTRACT

Methods, systems, and computer readable media may be operable to facilitate an automated pairing between an access point and station through a secure setup procedure. An access point may enter into an auto-connection mode after a boot of the access point, and while operating in the auto-connection mode, the access point may identify a station by retrieving attribute information carried by a probe request that is output from the station. The access point may compare the retrieved attribute information to one or more criteria attributes, and if the retrieved attribute information associated with the station matches the one or more criteria attributes, the access point may be placed into a secure setup mode. While the access point is in the secure setup mode, the station from which the probe request was received may be paired with the access point.

13 Claims, 4 Drawing Sheets

(56) References Cited

U.S. PATENT DOCUMENTS

| | | | |
|---|---|---|---|
| 2015/0351006 A1* | 12/2015 | Lim | H04W 48/14 |
| | | | 370/329 |
| 2015/0358830 A1* | 12/2015 | Bajko | H04W 48/14 |
| | | | 370/254 |
| 2016/0192191 A1* | 6/2016 | Lee | H04W 12/06 |
| | | | 726/7 |
| 2016/0219631 A1* | 7/2016 | Chen | H04W 76/02 |
| 2016/0337457 A1* | 11/2016 | Kim | H04L 67/16 |
| 2018/0049128 A1* | 2/2018 | Salomone | H04W 40/244 |
| 2018/0070271 A1* | 3/2018 | McCann | H04W 12/08 |
| 2018/0098302 A1* | 4/2018 | Oerton | H04W 64/00 |

OTHER PUBLICATIONS

Allawi et al, Advanced Handoff Mechanism for Delay Sensitive Applications in IEEE 802.11 Wireless Lan, 2008, IEEE, pp. 1517-1520.*

* cited by examiner

AUTHENTICATION BETWEEN WIRELESS CLIENT AND ACCESS POINT UTILIZING SMART CLIENT DETECTION

TECHNICAL FIELD

This disclosure relates to pairing an access point with one or more stations.

BACKGROUND

Modern architectures for video set-top boxes (STB) at a customer premise have moved to a model using a central device that may be an augmented STB (e.g., gateway STB) or a broadband access gateway in concert with smaller, less expensive STBs (e.g., client STBs) connected to the broadband video delivery network (e.g., via Internet protocol (IP)) for additional rooms or areas within the premise. The central gateway device may provide the core functionality for terminating cable services, including quadrature amplitude modulation (QAM) tuning for video and/or data over cable service interface specification (DOCSIS), conditional access termination, and often digital video recorder (DVR) functionality. It should be understood that the central gateway device may alternatively terminate other broadband access networks that provide video and data, such as digital subscriber line (DSL) or fiber. The client STBs may be IP-only devices that receive video services from the central gateway device, including linear or live video streaming, access to DVR content, and other services. The IP connection for these client STBs may be provided by various networking technologies such as Ethernet, multimedia over coax alliance (MoCA), wireless (e.g., WiFi), and others.

Wireless support is becoming more prevalent in STBs, enabling STBs to be installed in more locations without the need for a fixed or wired network connection and data path to reach the central gateway device.

STBs are typically installed at a customer premise by a service technician and often multiple STBs are installed in the premise. When installing a STB utilizing a wireless connection with a central gateway device, the technician must typically connect the STB to a wireless network provided by the central gateway device or other access point by entering a password associated with the network or by using some other secure setup procedure (e.g., WiFi Protected Setup (WPS)). These connection methods are cumbersome for a technician or at a minimum require extra steps that add to the overall install time (especially when installing multiple peripheral STBs).

For example, entry of a pre-shared key (PSK) requires the technician to remember or write down the access point's service set identifier (SSID) and password for the wireless network. When installing the peripheral STB, the technician must then select the proper SSID from a list of available networks and manually enter the password. Because STBs typically do not have a full "qwerty" keyboard, password entry is accomplished via a virtual on-screen keyboard, which can be cumbersome.

As another example, the WPS push button method of connection requires the technician to push a button (virtual or physical) on the station (e.g., client STB) and on the access point (e.g., within the central gateway device) within a certain duration of time of one another (i.e., typically around two minutes). This connection method may require a technician to return to the access point to initiate the WPS push button mode for each station that is installed, thereby adding to the installation time.

Entry of an access point personal identification number (PIN) requires the technician to remember or write down the access point's SSID and PIN value for the wireless network. When installing a station (e.g., peripheral STB), the technician must then select the proper SSID from a list of available networks and manually enter the PIN. Entry of the access point PIN at each installed station increases the overall installation time.

Various other out-of-band or near-field techniques for provisioning wireless credentials at a station require an initial hard-wired or near-field connection. These approaches require the technician to connect the station at a hard-wired or near field communication (NFC) location, then relocate and reinstall the station at the final destination. Using these techniques increases the overall installation time when multiple stations are installed within a premise.

Therefore, a need exists for improving methods and systems for pairing a station with an access point.

BRIEF DESCRIPTION OF THE DRAWINGS

Like reference numbers and designations in the various drawings indicate like elements.

DETAILED DESCRIPTION

It is desirable to improve upon methods and systems for pairing a station with an access point. Methods, systems, and computer readable media may be operable to facilitate an automated pairing between an access point and station through a secure setup procedure. An access point may enter into an auto-connection mode after a boot of the access point, and while operating in the auto-connection mode, the access point may identify a station by retrieving attribute information carried by a probe request that is output from the station. The access point may compare the retrieved attribute information to one or more criteria attributes, and if the retrieved attribute information associated with the station matches the one or more criteria attributes, the access point may be placed into a secure setup mode. While the access point is in the secure setup mode, the station from which the probe request was received may be paired with the access point.

An embodiment of the invention described herein may include a method comprising: (a) detecting an auto-connection mode trigger; (b) enabling an auto-connection mode at an access point; (c) receiving, at the access point, a probe request from a device; (d) retrieving one or more attributes from the probe request, wherein the attributes are associated with the device; (e) comparing the one or more retrieved attributes to one or more pre-configured criteria attributes; and (f) if the one or more retrieved attributes match one or more of the pre-configured criteria attributes: (i) enabling a secure setup mode at the access point; and (ii) pairing the device with the access point.

According to an embodiment of the invention, the auto-connection mode is enabled for a predetermined duration of time.

According to an embodiment of the invention, the secure setup mode comprises a wireless protected setup mode.

According to an embodiment of the invention, the auto-connection mode trigger comprises a boot of the access point, wherein the boot is of a boot type designated for enabling the auto-connection mode.

According to an embodiment of the invention, the boot type designated for enabling the auto-connection mode comprises an initial boot of the access point during installation of the access point.

According to an embodiment of the invention, at least one of the one or more retrieved attributes comprises an information element serving to identify a manufacturer of the device.

According to an embodiment of the invention, at least one of the one or more retrieved attributes comprises an information element serving to identify a model name or model number associated with the device.

According to an embodiment of the invention, at least one of the one or more retrieved attributes comprises a unique identifier associated with the device.

According to an embodiment of the invention, at least one of the one or more retrieved attributes comprises an indication that the device is operating in a secure setup mode.

An embodiment of the invention described herein may include an apparatus comprising: (a) an interface configured to be used to receive a probe request from a device; and (b) one or more modules configured to: (i) detect an auto-connection mode trigger; (ii) enable an auto-connection mode based on the detection of the auto-connection mode trigger; (iii) retrieve one or more attributes from the probe request, wherein the attributes are associated with the device; (iv) compare the one or more retrieved attributes to one or more pre-configured criteria attributes; (v) enable a secure setup mode if the one or more retrieved attributes match one or more of the pre-configured criteria attributes; and (vi) establish a wireless connection with the device.

An embodiment of the invention described herein may include one or more non-transitory computer readable media having instructions operable to cause one or more processors to perform the operations comprising: (a) detecting an auto-connection mode trigger; (b) enabling an auto-connection mode at an access point; (c) receiving, at the access point, a probe request from a device; (d) retrieving one or more attributes from the probe request, wherein the attributes are associated with the device; (e) comparing the one or more retrieved attributes to one or more pre-configured criteria attributes; and (f) if the one or more retrieved attributes match one or more of the pre-configured criteria attributes: (i) enabling a secure setup mode at the access point; and (ii) pairing the device with the access point.

Figure 1:
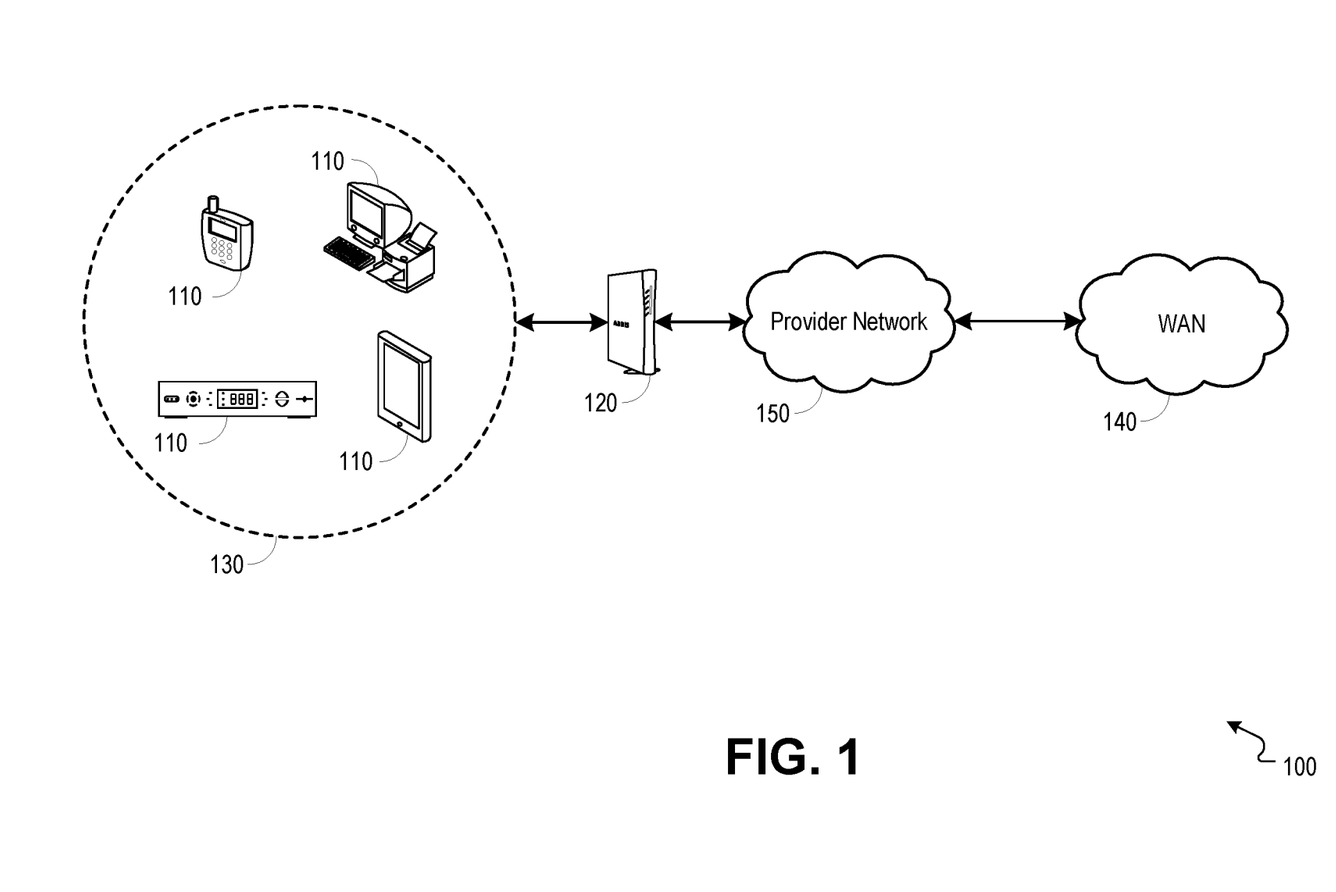
FIG. 1 is a block diagram illustrating an example network environment operable to facilitate an automated pairing between an access point and station through a secure setup procedure.

FIG. 1 is a block diagram illustrating an example network environment 100 operable to facilitate an automated pairing between an access point and station through a secure setup procedure. In embodiments, one or more customer premise equipment (CPE) devices (e.g., station 110, access point 120, and other devices that are not shown) may provide video and/or data services to a subscriber. An access point 120 may communicate with one or more stations 110 over a local network 130 (e.g., a local area network (LAN), a wireless local area network (WLAN), a personal area network (PAN), etc.) and may communicate with an upstream wide area network (WAN) 140 through a connection to a provider network 150. Stations 110 may include a set-top box (STB), computer, mobile device, tablet, or any other device operable to communicate wirelessly with an access point 120. An access point 120 may include a gateway device, a modem, a wireless router including an embedded modem, a wireless network extender or any other device operable to deliver data and/or video services from a WAN 130 to a station 110.

In embodiments, an access point 120 may communicate with a station 110 over a wired or a wireless connection. A wireless connection between the station 110 and access point 120 may be established through a secure setup procedure (e.g., Wi-Fi protected setup (WPS)). The secure setup procedure may include the steps of scanning multiple wireless channels for an available access point, exchanging one or more messages between a station 110 and access point 120, exchanging key messages (e.g., extensible authentication protocol (EAP) messages, lightweight EAP (LEAP) messages, or other message types carrying network credentials such as a pre-shared key (PSK)) between the station 110 and access point 120, and installing a key (e.g., PSK) at the station.

In embodiments, an access point 120 may support an auto-connection mode wherein a station 110 is identified and attributes of the station 110 are retrieved from a probe request, and based on a comparison with criteria attributes, the station 110 is automatically paired with the access point 120 using a secure setup procedure (e.g., WPS, WPS push button, etc.). The access point 120 may be configured to enter an auto-connection mode upon the occurrence of a boot at the access point 120. For example, the access point 120 may enter into an auto-connection mode after a warm boot (e.g., warm reset, power cycle, etc.), a cold boot (e.g., cold reset, etc.), a factory reset (e.g., first-time boot for the access point 120), or after any type of boot. In embodiments, the access point 120 may be configured to enter into an auto-connection mode only after an initial boot (e.g., factory reset occurring during install of the access point 120), thus auto-connection would only occur during installation of the access point 120 and any other stations 110 within a premise and the access point 120 would not be placed into an auto-connection mode after subsequent boots. It should be understood that the access point 120 may be configured to enter an auto-connection mode upon the occurrence of various conditions or events. In embodiments, the access point 120 may be placed into an auto-connection mode manually.

The access point 120 may be configured to remain in an auto-connection mode for some predetermined duration of time. While in the auto-connection mode, the access point 120 may inspect the contents of a probe request received from a station 110, and may compare attributes retrieved from the probe request to one or more pre-configured criteria attributes. Retrieved attributes and criteria attributes may include a device identifier such as a media access control (MAC) address, device manufacturer, device model number/name, and others. A retrieved attribute may also indicate whether the station 110 from which the probe request was received is in a secure setup mode (e.g., WPS push button mode). If the attributes retrieved from the probe request match the corresponding criteria attributes, the access point 120 may autonomously enter into a secure setup mode (e.g., WPS push button mode) and may complete authentication and association processes with the station 110. For example, if the attributes retrieved from the probe request indicate that the station 110 from which the probe request was received is in a secure setup mode and otherwise match the criteria attributes, the access point 120 may enter into a secure setup mode. It will be appreciated by those skilled in the relevant art that the duration for which the access point 120 remains in an auto-connection mode, as well as the various attribute criteria elements and values may be configured and/or altered by a manufacturer, service provider, technician, subscriber, and/or others.

When the access point 120 enters a secure setup mode, authentication and association between the access point 120 and a station 110 may automatically begin when the station 110 is placed in a secure setup mode. The station 110 may be configured to automatically enter a secure setup mode when a boot (e.g., first boot, warm boot, cold boot, etc.) occurs at the station 110. The station 110 may manually be placed into a secure setup mode (e.g., physical or virtual WPS push button).

It should be understood that when the access point 120 is automatically placed into the secure setup mode, the authentication and association between the access point 120 and station(s) 110 via the secure setup (e.g., WPS) may be made according to the rules and restrictions that are applicable during a standard secure setup. For example, a session overlap error may occur where more than one enrollee (e.g., station 110) or more than one registrar (e.g., access point 120) are active during the secure setup monitor period.

When a probe request is received from a station 110 after the auto-connection period has ended, or if the attributes retrieved from a probe request do not match the criteria attributes, the access point 120 may ignore the probe request or may otherwise refrain from automatically pairing with the station 110. A user may still pair the station 110 with the access point 120 using a different method (e.g., manual WPS push button entry, password entry, etc.).

In embodiments, the auto-connection mode of an access point 120 may be initiated, restarted, extended, terminated, and/or managed through a technician accessible service menu and/or remote management protocol (e.g., TR-069, simple network management protocol (SNMP), etc.).

Figure 2:
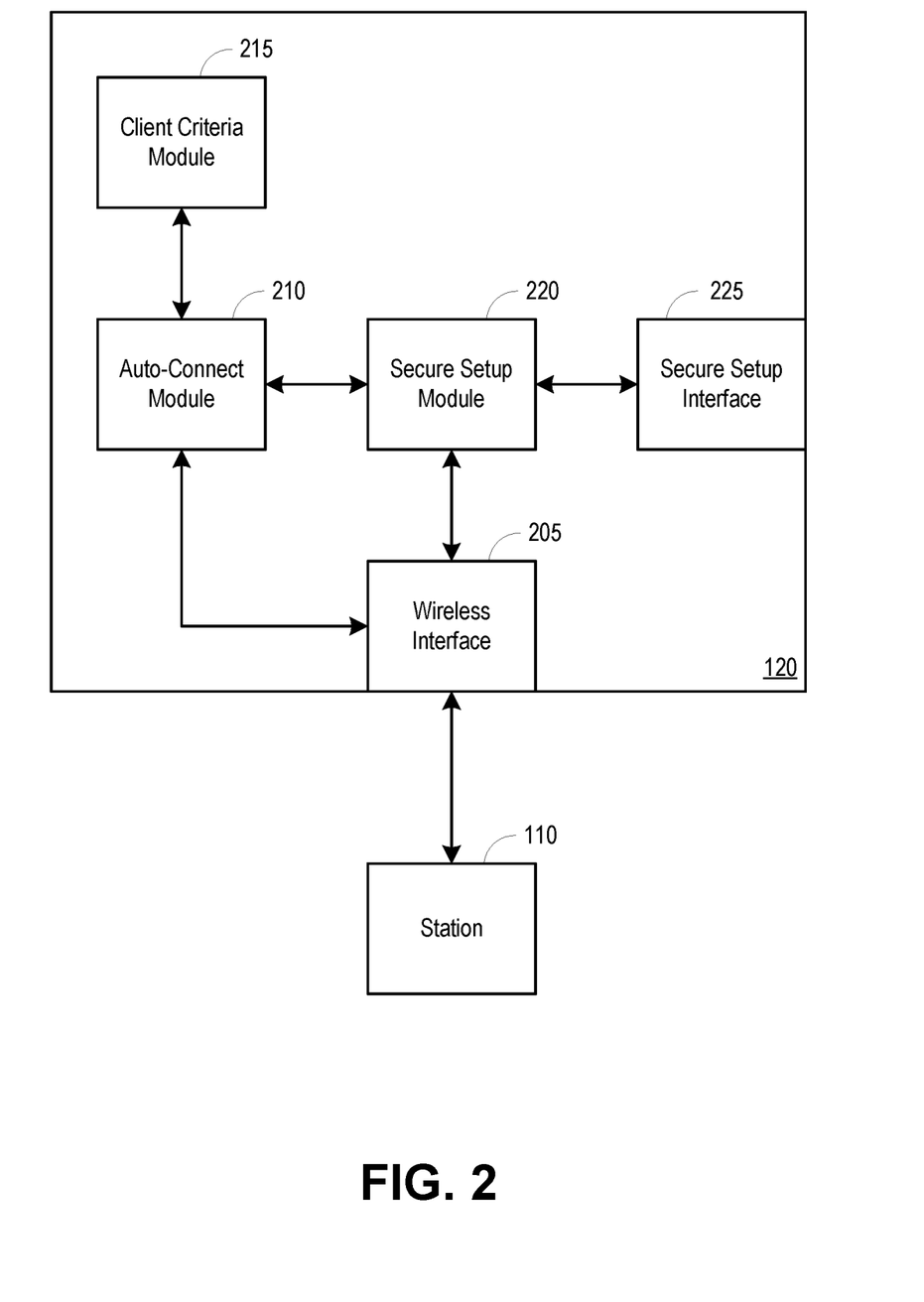
FIG. 2 is a block diagram illustrating an example access point operable to facilitate an automated pairing between an access point and station through a secure setup procedure.

FIG. 2 is a block diagram illustrating an example access point 120 operable to facilitate an automated pairing between an access point and station through a secure setup procedure. The access point 120 may include a wireless interface 205, an auto-connect module 210, a client criteria module 215, a secure setup module 220, and a secure setup interface 225.

In embodiments, an auto-connect module 210 may control an auto-connect feature at the access point 120, wherein the auto-connect feature allows a client device (e.g., station 110) to be automatically paired with the access point 120. The auto-connect module 210 may place the access point 120 into an auto-connect mode upon the occurrence of a predetermined event or condition. The predetermined event may be a specific type of boot occurring at the access point 120, wherein the boot type enables the auto-connection mode. For example, the auto-connect module 210 may place the access point 120 into an auto-connection mode after a warm boot (e.g., warm reset, power cycle, etc.), a cold boot (e.g., cold reset, etc.), a factory reset (e.g., first-time boot for the access point 120), or after any type of boot. The predetermined event may be a manual initiation, restart or extension of an auto-connect mode that is received at the access point 120 through an accessible service menu and/or remote management protocol (e.g., TR-069, simple network management protocol (SNMP), etc.). It should be understood that various other predetermined events may cause the auto-connect module 210 to place the access point 120 into an auto-connection mode. For example, a subscriber may use a station 110 to send a communication to the access point 120 when the subscriber wishes to associate a station with the access point 120, wherein the communication causes the auto-connect module 210 to place the access point 120 in an auto-connection mode.

The auto-connect module 210 may control the duration of time for which the access point 120 is operating in the auto-connect mode. In embodiments, the auto-connect module 210 may initiate an auto-connect mode timer when the access point 120 is placed into an auto-connect mode. The access point 120 may be preconfigured with an auto-connect mode timer duration of sufficient length to allow one or more client devices (e.g., station 110) to be installed within a subscriber premise and paired with the access point 120. It should be understood that the duration of the auto-connection mode timer may be any duration of time (e.g., ten, twenty, thirty, sixty minutes, etc.).

While the auto-connect mode is active at the access point 120, the auto-connect module 210 may inspect the contents of each probe request received from one or more client devices (e.g., station 110). The probe requests may be received at the access point 120 through the wireless interface 205 and may include one or more attributes associated with the client device from which the probe request is received. For example, attribute information carried by a probe request may include information serving to identify the client device (e.g., media access control (MAC) address, manufacturer of the device, model number/name of the device, unique identifier, etc.), information serving to identify one or more networks which the client device has previously been associated with (e.g., service set identifier, access point identification, etc.), information indicating whether or not the client device is operating in a secure setup mode (e.g., WPS, push button WPS, etc.) and/or other information associated with the client device.

In embodiments, the auto-connect module 210 may compare attributes associated with a received probe request to one or more attribute criteria that may be required for an automatic pairing between the access point and the client device from which the probe request was received. Attribute criteria may be maintained at the client criteria module 215, and the attribute criteria may include specific criteria that a client device must meet before being automatically paired with the access point 120. For example, attribute criteria may require that a client device be associated with a certain manufacturer, be of a certain model number/name, and/or be operating in a secure setup mode (e.g., WPS, push button WPS, etc.). If the attributes associated with a probe request match each of the attribute criteria, the auto-connect module 210 may allow the automatic pairing between the access point 120 and the client device from which the probe request was received to proceed. It should be understood that the access point 120 might not be configured with any attribute criteria, in which case, any client device, regardless of associated attributes, may be automatically paired with the access point 120.

While the access point 120 is operating in an auto-connect mode and if the probe request attributes match the attribute criteria as configured at the access point 120, the secure setup module 220 may initiate a secure setup with the client device from which the probe request was received. In embodiments, the secure setup module 220 may initiate a secure setup (e.g., WPS, WPS push button, passphrase entry, etc.) and may complete authentication and association with the client device. The access point 120 may communicate with the client device (e.g., station 110) through the wireless interface 205 to complete the authentication and association procedures. For example, the secure setup procedure may include an exchange of one or more messages (e.g., extensible authentication protocol (EAP) messages) between the client device and access point 120, wherein the messages include configurations, credentials, and/or other information associated with the client device and with the wireless network provided by the access point 120. The information exchanged between the client device and access point 120 may be used to establish a wireless connection between the client device and access point 120, the connection being operable to facilitate the delivery of one or more services to the client device.

If the auto-connection timer has expired when a probe request is received or if the attributes associated with the probe request do not match up with the corresponding client device attribute criteria, then the access point 120 may refrain from responding to the received probe request or may otherwise preclude the automatic pairing between the access point 120 and the client device from which the probe request was received. In embodiments, the access point 120 may be manually placed into a secure setup mode (e.g., WPS, push button WPS, etc.). For example, the secure setup interface 225 may include one or more physical buttons (e.g., WPS button), and when the button is depressed, the secure setup module 220 may place the access point 120 into a secure setup mode. If a station 110 is in a secure setup mode when the access point 120 is placed into a secure setup mode or if a station 110 is placed into a secure setup mode while the access point 120 is in a secure setup mode, the station 110 and access point 120 may be paired together through the completion of association and authentication procedures.

Figure 3:
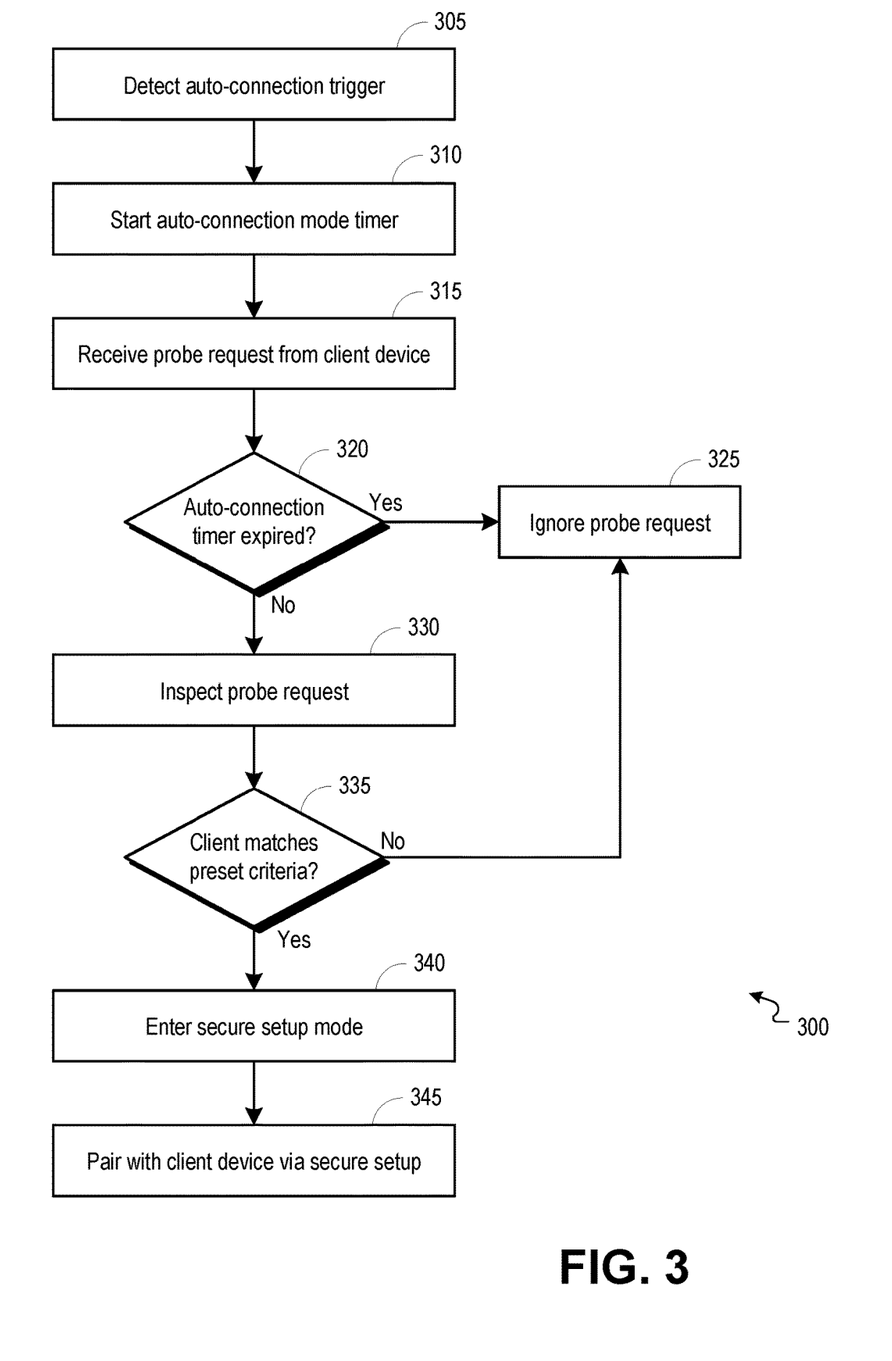
FIG. 3 is a flowchart illustrating an example process operable to facilitate an automated pairing between an access point and station through a secure setup procedure.

FIG. 3 is a flowchart illustrating an example process 300 operable to facilitate an automated pairing between an access point and station through a secure setup procedure. The process 300 may begin at 305, when an access point (e.g., access point 120 of FIG. 1) detects an auto-connection trigger. Detection of an auto-connection trigger may be the access point entering a type of boot that enables an auto-connection mode. The occurrence of a boot type enabling the auto-connection mode may be recognized, for example, by the auto-connect module 210 of FIG. 2. In embodiments, an access point 120 may be configured to enter into an auto-connection mode upon the occurrence of one or more boot types. For example, the access point 120 may be configured to enter into an auto-connection mode after a warm boot (e.g., warm reset, power cycle, etc.), a cold boot (e.g., cold reset, etc.), a factory reset (e.g., first-time boot for the access point 120), or after any type of boot. It should be understood that an access point 120 may be configured such that the access point 120 does not enter into an auto-connection mode after any type of boot, but is instead placed into an auto-connection mode manually by a user (e.g., subscriber, technician, etc.). The auto-connection mode for an access point 120 may be restarted, extended, terminated, or otherwise managed through an accessible service menu and/or remote management protocol (e.g., TR-069, SNMP, etc.). It should be understood that the auto-connection trigger may include the occurrence of various other events or conditions.

At 310, an auto-connection mode timer may be started. The auto-connection mode may be initiated and maintained, for example, by the auto-connect module 210 of FIG. 2. In embodiments, the duration of the auto-connection mode timer may be preset for an access point 120 by a device manufacturer or service provider, and may be configurable by a service technician or subscriber. The duration of the auto-connection mode timer may be of sufficient duration to allow one or more stations (e.g., stations 110 of FIG. 1) to be installed within a subscriber premise and paired with the access point 120. It should be understood that the duration of the auto-connection mode timer may be any duration of time (e.g., ten, twenty, thirty, sixty minutes, etc.).

At 315, a probe request may be received from a client device (e.g., station 110 of FIG. 1). The probe request may be received at the access point 120 (e.g., through a wireless interface 205 of FIG. 2). In embodiments, the probe request may be a request for an identification of the access point 120 and/or a request to join a service set provided by the access point 120.

At 320, a determination may be made whether the auto-connection mode timer has expired. The determination whether the auto-connection mode timer has expired may be made, for example, by the auto-connect module 210 of FIG. 2. So long as the access point 120 is operating in the auto-connection mode (e.g., before the auto-connection mode timer expires), the auto-connect module 210 may inspect each probe request to determine whether the client device from which the probe request is delivered may be automatically paired with the access point 120.

If, at 320, the determination is made that the auto-connection timer has expired, the process 300 may proceed to 325. At 325, the probe request may be ignored and the access point 120 may refrain from responding to the probe request with a probe response or may otherwise refrain from automatically pairing with the client device from which the probe request is received. In embodiments, when the auto-connection period has ended, a user may attempt to pair the client device with the access point 120 using a different pairing method. For example, using a password entry or push-button method, a secure setup (e.g., Wi-Fi protected setup (WPS)) may be manually initiated at the access point 120, the client device (e.g., station 110), or both. It should be understood that various other methods for manually pairing the access point 120 with the client device may be attempted.

Returning to 320, if the determination is made that the auto-connection timer has not expired, the process 300 may proceed to 330. At 330, the received probe request may be inspected. The probe request may be inspected, for example, by the auto-connect module 210 of FIG. 2. In embodiments, information identifying the client device from which the probe request was received (e.g., MAC address, unique device name or properties, etc.), information identifying a network with which the client device was previously associated (e.g., SSID), and/or other attributes associated with the client device may be retrieved from an inspection of the probe request. The probe request may include other information identifying one or more attributes associated with the client device (e.g., information elements identifying one or more manufacturer attributes, model name attributes, etc.). The probe request may provide an indication that the client device from which the probe request is received is operating in a secure setup mode (e.g., WPS push button mode). For example, the client device may automatically enter a secure setup mode upon the occurrence of a boot at the client device or may be manually placed in a secure setup mode (e.g., WPS push button).

At 335, a determination may be made whether attributes associated with the client device from which the probe request is received match one or more preconfigured client device criteria attributes. The determination whether attributes associated with the client device match client device criteria attributes may be made, for example, by the client criteria module 215 of FIG. 2. In embodiments, a list of one or more client device criteria attributes may be configured and maintained at the access point 120 (e.g., at client criteria module 215), and the client device criteria attributes may provide a definition for the client devices and/or types of client devices that may be automatically paired with the access point 120 through a secure setup procedure. For example, the one or more client device criteria attributes may include attribute identifiers (e.g., device manufacturer attribute, device model name attribute, etc.) and specific whitelist values (e.g., specific manufacturer(s), specific model number(s)/name(s), etc.) for each attribute, and the probe request may need to include each required attribute identifier and an attribute value matching those of the client device criteria attributes in order for the client device from which the probe request is received to be automatically paired with the access point 120. It should be understood that the access point 120 may be configured such that no client device criteria attributes are defined, thereby allowing any client device to be automatically paired with the access point 120.

If, at 335, the determination is made that each of the one or more client device criteria attributes is not met by the attributes retrieved from the received probe request, the process 300 may proceed to 325 where the probe request is ignored by the access point 120.

If, at 335, the determination is made that each of the one or more client device criteria attributes is met by the attributes retrieved from the received probe request, the process 300 may proceed to 340. At 340, the access point 120 may enter a secure setup mode. A secure setup mode may be initiated at an access point 120, for example, at a secure setup module 220 of FIG. 2. While operating in a secure setup mode (e.g., WPS), the access point may accept and respond to one or more messages operable to facilitate the pairing of a client device (e.g., station 110) with the access point 120.

At 345, the client device from which the probe request is received may be paired with the access point 120 via a secure setup procedure. The pairing of the client device (e.g., station 110) with the access point 120 may be handled, for example, by the secure setup module 220 of FIG. 2. In embodiments, the secure setup procedure may include an exchange of one or more messages (e.g., EAP messages) between the client device and access point 120, wherein the messages include configurations, credentials, and/or other information associated with the client device and with the wireless network provided by the access point 120. The information exchanged between the client device and access point 120 may be used to establish a wireless connection between the client device and access point 120, the connection being operable to facilitate the delivery of one or more services to the client device.

Figure 4:
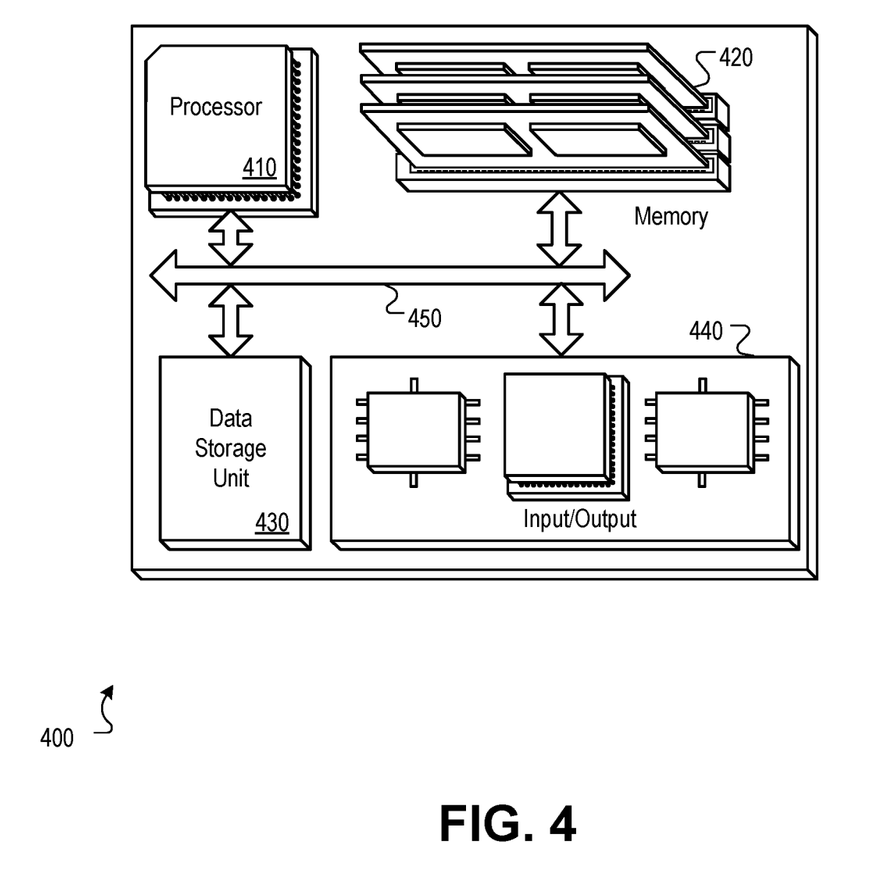
FIG. 4 is a block diagram of a hardware configuration operable to facilitate an automated pairing between an access point and station through a secure setup procedure.

FIG. 4 is a block diagram of a hardware configuration 400 operable to facilitate an automated pairing between an access point and station through a secure setup procedure. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., access point 120 of FIG. 1, cable modem, router, wireless extender, or other access device) or subscriber device (e.g., station 110 of FIG. 1, television, mobile device, tablet, STB, etc.). In embodiments, the input/output device can include driver devices configured to send communications to, and receive communications from one or more networks (e.g., WAN 140 of FIG. 1, local network 130 of FIG. 1, provider network 150, etc.).

Those skilled in the art will appreciate that the invention described herein improves upon methods and systems for pairing a station with an access point. Methods, systems, and computer readable media may be operable to facilitate an automated pairing between an access point and station through a secure setup procedure. An access point may enter into an auto-connection mode after a boot of the access point, and while operating in the auto-connection mode, the access point may identify a station by retrieving attribute information carried by a probe request that is output from the station. The access point may compare the retrieved attribute information to one or more criteria attributes, and if the retrieved attribute information associated with the station matches the one or more criteria attributes, the access point may be placed into a secure setup mode. While the access point is in the secure setup mode, the station from which the probe request was received may be paired with the access point.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
    detecting an auto-connection mode trigger, wherein the auto-connection mode trigger comprises a boot of an access point, wherein the boot is of a boot type designated for enabling the auto-connection mode;
    starting an auto-connection mode timer;
    enabling an auto-connection mode at the access point;
    receiving, at the access point, a probe request from a device;
    determining that the auto-connection mode timer has not expired;
    retrieving one or more attributes from the probe request, wherein the attributes comprise identification information associated with one or more identifying features of the device, wherein at least one of the one or more retrieved attributes comprises an information element serving to identify at least one of: a manufacturer of the device; a model name associated with the device; a model number associated with the device;
    comparing the one or more retrieved attributes to one or more pre-configured criteria attributes, wherein the one or more pre-configured criteria attributes comprise one or more criteria attributes that are required for enabling a secure setup mode at the access point;
    determining that one or more retrieved attributes match one or more of the pre-configured criteria attributes;
    based upon the determination that one or more retrieved attributes match one or more of the pre-configured criteria attributes:
    enabling a secure setup mode at the access point; and
    pairing the device with the access point.

2. The method of claim 1, wherein the auto-connection mode is enabled for a predetermined duration of time.

3. The method of claim 1, wherein the secure setup mode comprises a wireless protected setup mode.

4. The method of claim 1, wherein the boot type designated for enabling the auto-connection mode comprises an initial boot of the access point during installation of the access point.

5. The method of claim 1, wherein at least one of the one or more retrieved attributes comprises a unique identifier associated with the device.

6. The method of claim 1, wherein at least one of the one or more retrieved attributes comprises an indication that the device is operating in a secure setup mode.

7. An apparatus comprising:
    an interface that receives a probe request from a device; and
    one or more modules that:
    detect an auto-connection mode trigger, wherein the auto-connection mode trigger comprises a boot of an access point, wherein the boot is of a boot type designated for enabling the auto-connection mode;
start an auto-connection mode timer;
enable an auto-connection mode based on the detection of the auto-connection mode trigger;
determine that the auto-connection mode timer has not expired;
retrieve one or more attributes from the probe request, wherein the attributes comprise identification information associated with one or more identifying features of the device, wherein at least one of the one or more retrieved attributes comprises an information element serving to identify at least one of: a manufacturer of the device; a model name associated with the device; a model number associated with the device;
compare the one or more retrieved attributes to one or more pre-configured criteria attributes, wherein the one or more pre-configured criteria attributes comprise one or more criteria attributes that are required for enabling a secure setup mode at the access point;
determine that one or more retrieved attributes match one or more of the pre-configured criteria attributes;
based upon the determination that one or more retrieved attributes match one or more of the pre-configured criteria attributes:
enable a secure setup mode at the access point; and
establish a wireless connection with the device.

8. The apparatus of claim 7, wherein the auto-connection mode is enabled for a predetermined duration of time.

9. One or more non-transitory computer readable media having instructions operable to cause one or more processors to perform the operations comprising:
detecting an auto-connection mode trigger, wherein the auto-connection mode trigger comprises a boot of an access point, wherein the boot is of a boot type designated for enabling the auto-connection mode;
starting an auto-connection timer;
enabling an auto-connection mode at the access point;
receiving, at the access point, a probe request from a device;
determining that the auto-connection timer has not expired;
retrieving one or more attributes from the probe request, wherein the attributes comprise identification information associated with one or more identifying features of the device, wherein at least one of the one or more retrieved attributes comprises an information element serving to identify at least one of: a manufacturer of the device; a model name associated with the device; a model number associated with the device;
comparing the one or more retrieved attributes to one or more pre-configured criteria attributes, wherein the one or more pre-configured criteria attributes comprise one or more criteria attributes that are required for enabling a secure setup mode at the access point;
determining that one or more retrieved attributes match one or more of the pre-configured criteria attributes;
based upon the determination that one or more retrieved attributes match one or more of the pre-configured criteria attributes:
enabling a secure setup mode at the access point; and
pairing the device with the access point.

10. The one or more non-transitory computer-readable media of claim 9, wherein the auto-connection mode is enabled for a predetermined duration of time.

11. The one or more non-transitory computer-readable media of claim 9, wherein the boot type designated for enabling the auto-connection mode comprises an initial boot of the access point during installation of the access point.

12. The one or more non-transitory computer-readable media of claim 9, wherein at least one of the one or more retrieved attributes comprises a unique identifier associated with the device.

13. The one or more non-transitory computer-readable media of claim 9, wherein at least one of the one or more retrieved attributes comprises an indication that the device is operating in a secure setup mode.

* * * * *